Figure 1:
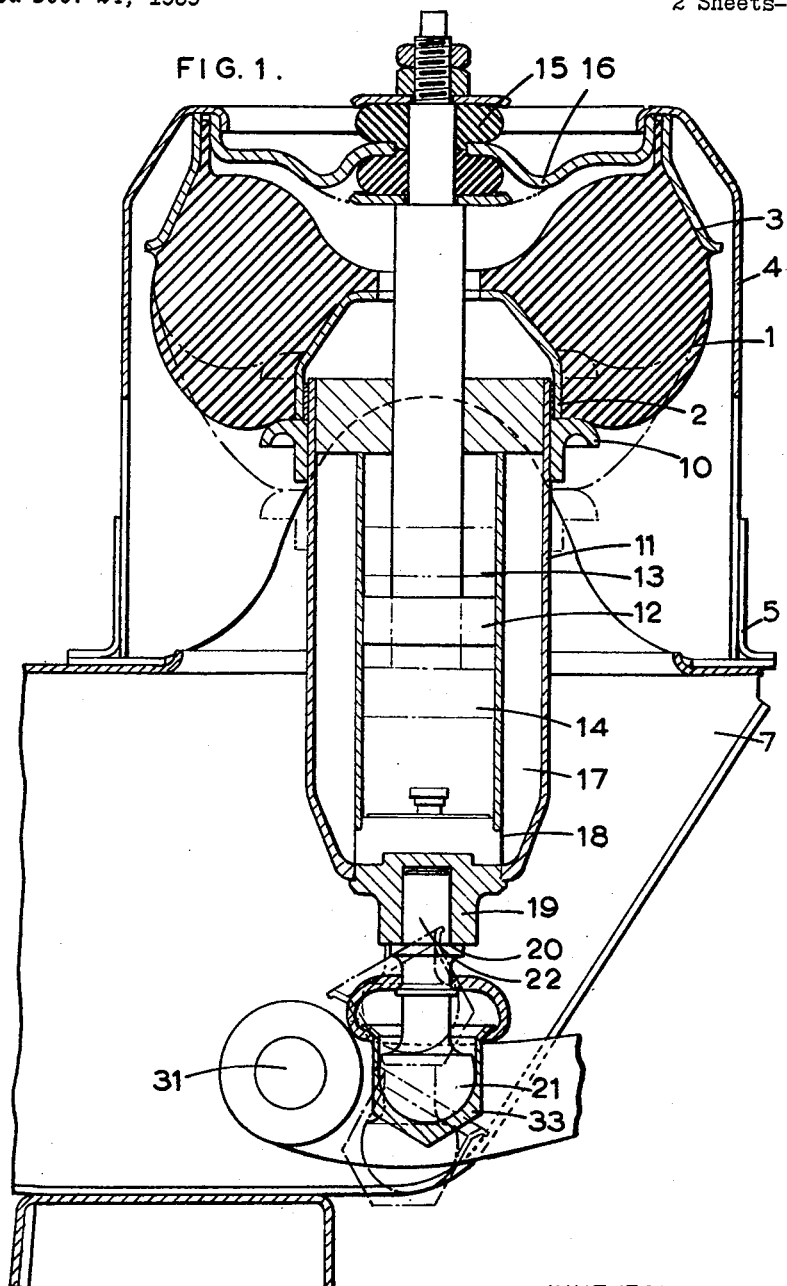

April 3, 1962

A. E. MOULTON 3,028,155

SPRING SUSPENSIONS

Filed Dec. 24, 1959

2 Sheets-Sheet 1

INVENTOR
Alexander E. Moulton

BY

ATTORNEY

April 3, 1962 A. E. MOULTON 3,028,155
SPRING SUSPENSIONS
Filed Dec. 24, 1959 2 Sheets-Sheet 2

INVENTOR
Alexander E. Moulton

BY
ATTORNEY

3,028,155
SPRING SUSPENSIONS
Alexander Eric Moulton, Bradford-on-Avon, England, assignor to Moulton Developments Limited, Bradford-on-Avon, England, a company of Great Britain
Filed Dec. 24, 1959, Ser. No. 861,869
2 Claims. (Cl. 267—21)

This invention relates to spring suspensions and hydraulic dampers especially suitable for use in automobiles and other road vehicles.

In United States patent specification No. 2,858,127 there is described a frusto-conical rubber-to-metal bonded sandwich or cone spring and in British specification No. 793,772 there is described a combinatoin of two such cone springs with a telescopic hydraulic damper, which together make a suspension unit suitable for mounting between the sprung structure of a vehicle at the top end of the spring, and the unsprung wheel suspension arm at the base end of the damper through a ball-joint.

It has now been found that a unit of greater simplicity, cheapness and compactness can be employed with means now available which enable the combined suspension unit and damper to work at a higher leverage with respect to the suspension arm suitably of the order of 1:5 instead of 1:2.5.

Due to the lower stroke of the suspension unit for a given wheel movement relative to the sprung structure resulting from the higher ratio of mechanical advantage, the unit only requires a single rubber spring, preferably a frusto-conical spring which is itself stable and which therefore does not require to be maintained centralised by the telescoping members of the hydraulic damper.

One object of the present invention is to provide a vehicle wheel suspension arrangement including a telescopic hydraulic damper with its cylinder mounted to operate against a wheel suspension arm and its piston connected to the sprung structure of the vehicle, and including also a single rubber-to-metal bonded sandwich spring surrounding the cylinder of the damper and bearing thereon so as to be deformed during the working of the suspension, the connection between the cylinder and the suspension arm is by means of an articulated joint, so located that the mechanical advantage exerted by the combined spring and damper on the suspension arm is of the order of 1:5.

Preferably, the rubber-to-metal bonded sandwich spring comprises a frusto-conical rubber body having metal rings bonded to both its innermost and outermost faces, and while at the lower end of the damper there is provided a high duty joint effecting the articulating connection between the wheel suspension arm and the unit, which joint may incorporate either a roller bearing or a part-spherical steel ball working in a nylon seating.

Preferably also, the assembly is installed in a fabricated sheet metal box structure, the sheet metal walls of which are economically designed with regard to the material used and take in tension the large separating loads between the top of the spring unit where it is attached to the vehicle, and the journal bearing of the wheel suspension arm on which the spring unit is bearing. The box structure including the spring unit and wheel suspension arm are advantageously prefabricated of light material and in such manner that the components can be preassembled for installation in the vehicle. For this reason also the journal bearing is advantageously of needle roller type.

In one embodiment of combined rubber cone spring and damper unit suspension according to the invention the outer metallic shell of the frusto-conical rubber sandwich is situated within the top of the aforementioned metal box structure and depending centrally within such box is the piston rod of a hydraulic damper, the upper end of which rod is secured to a top closure member for the box through the medium of rubber washers.

Any appropriate or conventional type of hydraulic damper may be employed but preferably there is the conventional annular recuperation chamber surrounding the cylinder containing the piston which communicates with the interior of the cylinder through a valve or port, the external wall of the annular chamber being furnished over its upper end with a flange ring which engages the inner shell of the frusto-conical rubber sandwich to deform the rubber in shear and compression during upward movements of the wheel suspension arm and the casing of the damper acting thereby as an economical and efficient compression strut for communicating the load from the wishbone to the structure through the rubber springing means. At the lower end of the outer tube, the articulated joint is detachably mounted by a spigot piece. This detachable mounting permits the ready interposition of packing washer to make up for loss of trim height due to "creep" of the rubber after prolonged service.

Figure 2:
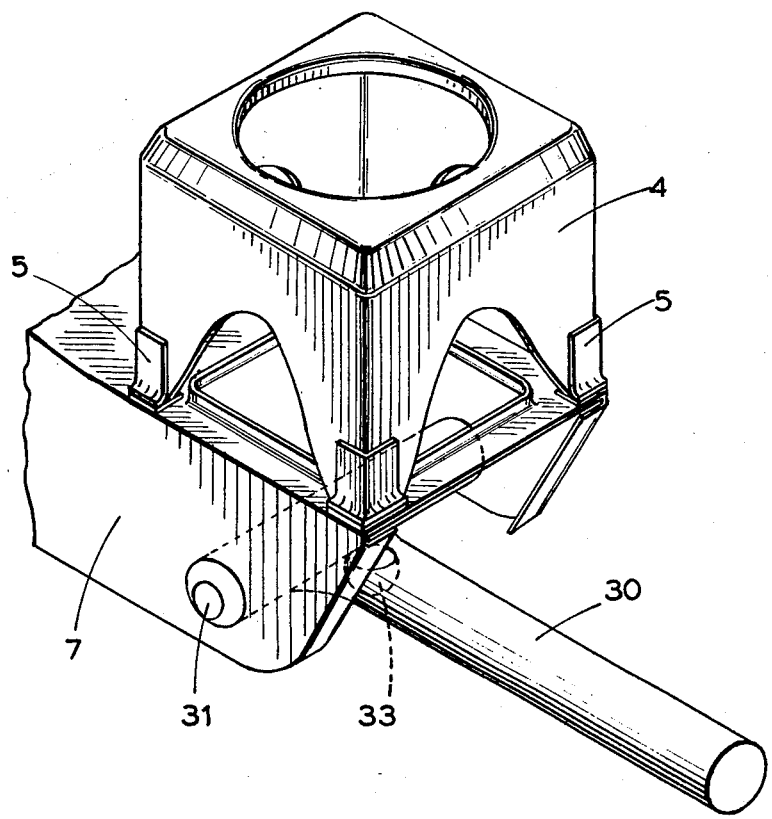

One embodiment of the invention as applied to a vehicle front wheel suspension will be described with reference to the accompanying drawings in which FIGURE 1 is a vertical section of a combined rubber spring and damper unit arranged for use in an independent vehicle wheel suspension, while FIGURE 2 is an elevational view illustrating the method of mounting a unit according to the invention.

Referring now to the drawings, and first more particularly to FIGURE 1, the unit illustrated includes a frusto-conical rubber sandwich spring 1 having inner and outer metal shells 2 and 3 respectively. The metal shell 3 bears upon the upper ends of the walls 4 of a metal box structure whose lower part consists of four legs 5 each rigidly attached to the underframe of the vehicle suitably a cross member 7.

The inner metal shell 2 bears on a flange ring 10 furnished on the outer wall 11 of a hydraulic damper.

The hydraulic damper may be of any appropriate type and in this embodiment includes a piston 12 having a piston rod 13 whose upper end is attached by a resilient mounting generally designated 15 to the top cover 16 of the aforementioned box structure. The piston rod 12 rides in a cylinder 14. The outer wall 11 of the damper forms the outer wall of an annular recuperation chamber 17, surrounding the cylinder 14, communication between the cylinder 14 and the chamber 17 being through a valve or port whose location is indicated at 18.

The lower ends of the outer wall 11 and of the cylinder 14 are rigidly attached to a member 19 having a recess 20 in which the ball spigot 22 of an articulated joint is detachably mounted. This detachable mounting permits the ready interposition of packing washers to make up for loss of trim height due to "creep" of the rubber after prolonged service. In the embodiment the joint comprises a ball 21 riding in a socket 33 but any convenient form of joint may be used.

Referring now also to FIGURE 2, 30 represents a wheel supporting arm connected to the chassis 7 by a needle type roller bearing 31 at about a distance of one-fifth of the total length of the arm, from the bearing 31 is located the socket 33 adapted to receive the ball 21, such socket being suitably of nylon.

When the invention is applied to a vehicle rear wheel suspension the arrangement may be of the kind described in United States patent specification Serial No. 857,334, the suspension arm being of the trailing type pivoting about a bearing whose axis of rotation lies transversely of the vehicle. The combined spring and damper unit according to the invention may be arranged to bear directly onto the trailing arm or alternatively against a crank lever formed thereon, as described in the aforementioned application No. 857,334.

By the present invention an improved suspension arrangement including a combined, rubber spring and shock absorber device is obtained, which is inherently robust and economical and which can be readily and compactly installed.

What I claim is:

1. A vehicle wheel suspension arrangement, including a telescopic hydraulic damper with its cylinder mounted to operate against a wheel supporting arm and its piston connected to the sprung structure of the vehicle, and including also a single rubber-to-metal bonded shear-spring surrounding the cylinder of the damper and bearing thereon so as to be deformed during the working of the suspension, the connection between the cylinder and the supporting arm being by means of an articulated joint, and wherein the shear spring comprises a frusto-conical rubber body having metal rings bonded to both its inner and outer faces, the inner metal ring bearing on the casing of the damper, and wherein the spring and damper assembly are installed in a sheet metal box structure against the top of which the outer metal ring of the spring bears, the sheet metal walls of the box structure taking in tension the large separating loads between the top of the spring unit and the journal of the wheel supporting arm with which the assembly is associated.

2. A vehicle wheel suspension arrangement according to claim 1 wherein the articulated joint connection comprises a hardened steel ball element spigotted into a recess at the base of the cylinder casing and riding in a socket carried by the supporting arm, said joint being situated so that the damper and the spring operate against the supporting arm at a point about one-fifth of the effective length of said arm from its journal.

References Cited in the file of this patent

UNITED STATES PATENTS

| 2,104,499 | Svoboda et al. | Jan. 4, 1938 |
| 2,202,615 | Barenyi | May 28, 1940 |

FOREIGN PATENTS

| 183,609 | Austria | Oct. 25, 1955 |
| 793,772 | Great Britain | Apr. 23, 1958 |